(12) United States Patent  
Koshutin

(10) Patent No.: US 9,365,224 B1
(45) Date of Patent: Jun. 14, 2016

(54) COLLAPSIBLE CARRYING DEVICE

(71) Applicant: Igor Koshutin, Rochester, MN (US)

(72) Inventor: Igor Koshutin, Rochester, MN (US)

(73) Assignees: Igor Koshutin, Rochester, MN (US); Elena Koshutina, Rochester, MN (US); Dmitry Koshutin, Los Angeles, CA (US)

(*) Notice: Subject to any disclaimer, the term of this patent is extended or adjusted under 35 U.S.C. 154(b) by 0 days.

(21) Appl. No.: 14/790,239

(22) Filed: Jul. 2, 2015

(51) Int. Cl.
*B62B 5/00* (2006.01)
*B62B 1/04* (2006.01)
*B62B 5/06* (2006.01)

(52) U.S. Cl.
CPC .............. *B62B 1/042* (2013.01); *B62B 5/0023* (2013.01); *B62B 5/0079* (2013.01); *B62B 5/065* (2013.01); *B62B 5/068* (2013.01)

(58) Field of Classification Search
CPC ................ B62B 5/0023; B62B 1/008–1/06; B62B 1/10–1/125
See application file for complete search history.

(56) References Cited

U.S. PATENT DOCUMENTS

| | | | | |
|---|---|---|---|---|
| 3,698,738 A * | 10/1972 | Bossert | ............ | B62B 1/045 280/762 |
| 4,793,622 A * | 12/1988 | Sydlow | ............ | B62B 1/042 280/40 |
| 4,887,837 A * | 12/1989 | Bonewicz, Jr. | ............ | B62B 1/12 108/129 |
| 4,961,593 A * | 10/1990 | Sanders | ............ | B62B 1/045 280/40 |
| 5,306,027 A * | 4/1994 | Cheng | ............ | B62B 1/045 280/30 |
| 5,505,471 A * | 4/1996 | Cheng | ............ | B62B 1/047 280/30 |
| 5,829,585 A * | 11/1998 | Kao | ............ | B62B 1/047 206/315.3 |
| 5,857,684 A * | 1/1999 | Liao | ............ | B60L 11/1822 280/40 |
| 5,971,424 A * | 10/1999 | Ingalls | ............ | B62B 1/125 280/654 |
| 6,139,033 A * | 10/2000 | Western | ............ | B62B 1/02 280/1.5 |
| 6,935,643 B1 * | 8/2005 | Purpuro | ............ | B62B 5/068 280/1.5 |
| 7,159,878 B1 * | 1/2007 | Mc Kenna | ............ | A45C 5/14 280/47.26 |
| 2002/0017767 A1 * | 2/2002 | Sawyer | ............ | A63B 21/023 280/37 |
| 2005/0161916 A1 * | 7/2005 | Taylor | ............ | B62B 1/125 280/655.1 |
| 2005/0258621 A1 * | 11/2005 | Johnson | ............ | B62B 1/12 280/651 |
| 2005/0275175 A1 * | 12/2005 | Murphy | ............ | A63B 55/00 280/47.26 |
| 2007/0024030 A1 * | 2/2007 | Yang | ............ | B62B 1/045 280/652 |
| 2007/0194560 A1 * | 8/2007 | Zink | ............ | B62B 1/12 280/652 |
| 2009/0266833 A1 * | 10/2009 | Savage | ............ | A45C 13/385 220/757 |
| 2011/0049823 A1 * | 3/2011 | Coats | ............ | B62B 1/06 280/47.3 |
| 2012/0205884 A1 * | 8/2012 | Craven | ............ | B62B 1/008 280/47.3 |
| 2012/0242063 A1 * | 9/2012 | Bruckner | ............ | B62B 1/002 280/651 |
| 2013/0207358 A1 * | 8/2013 | Appleby | ............ | B62B 1/26 280/30 |
| 2015/0208780 A1 * | 7/2015 | Avery | ............ | A45C 13/385 280/652 |
| 2015/0291194 A1 * | 10/2015 | Robinson | ............ | B62B 1/26 280/47.18 |
| 2015/0336220 A1 * | 11/2015 | Christopher | ....... | B23K 37/0294 219/137.2 |

* cited by examiner

*Primary Examiner* — Jeffrey J Restifo
*Assistant Examiner* — Erez Gurari
(74) *Attorney, Agent, or Firm* — Nadya Reingand; Yan Hankin

(57) ABSTRACT

A collapsible and expandable carrying device for pulling, carrying, or otherwise transporting luggage, cargo, or any other items. The carrying device comprises a frame comprised of and combined with additional telescopic rods for adjustment of parameters for ease of use. The frame is pivotally attached to a handle, support straps, shoulder straps, and/or a belt to be attached to a user's waist. The device is meant for both short and long travel, and it allows for a user to vary angles and lengths of the constituent parts in order to minimize gravitational load on the user and optimize the force of the center of gravity from the load being carried.

20 Claims, 29 Drawing Sheets

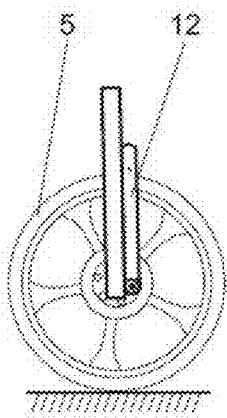
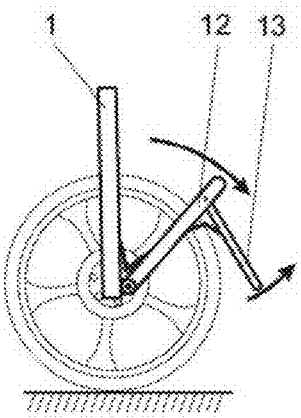
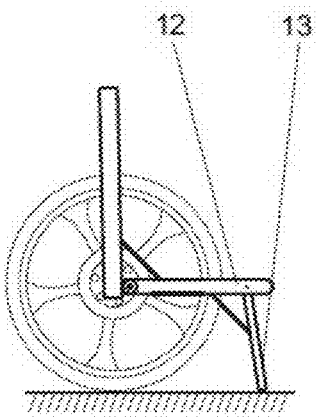
Fig. 4  Fig. 5  Fig. 6
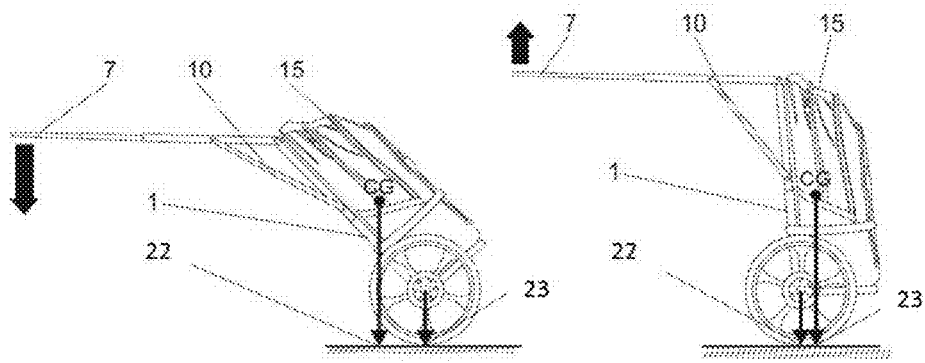
Fig. 7  Fig. 8

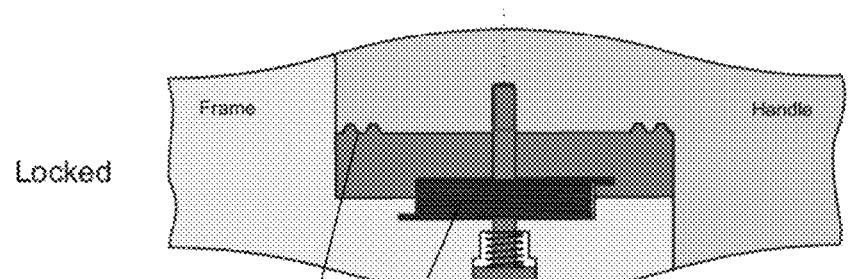
Fig. 27 Locked
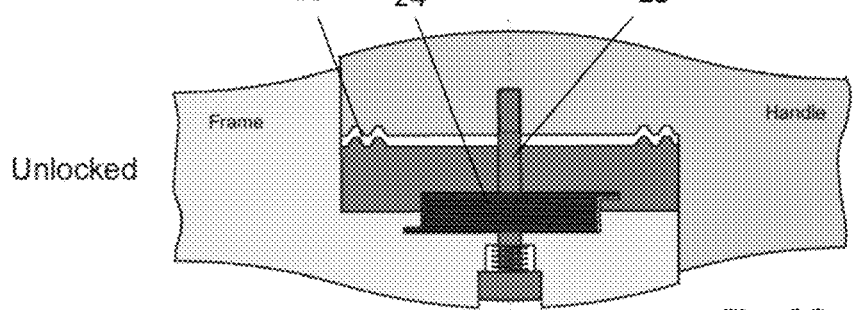
Fig. 28 Unlocked
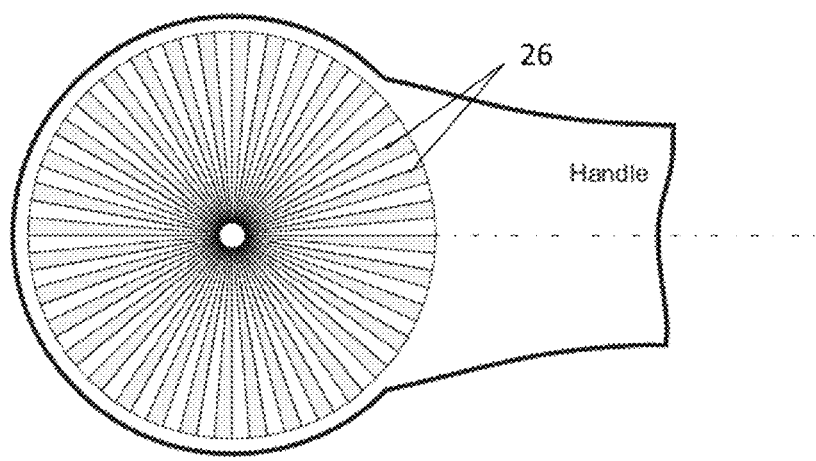
Fig. 29

COLLAPSIBLE CARRYING DEVICE

CROSS REFERENCE TO RELATED APPLICATIONS

The present application claims priority to Ukranian patent application u201414137 filed Dec. 29, 2014, currently issued as Ukranian patent No. 98114.

FIELD OF THE INVENTION

This invention relates to the field of devices for carrying, pulling, or otherwise transporting bags and other gear or luggage. In particular, the present invention relates to the field of universal convertible travel devices. The invention may be classified as a travel accessory and can be used by backpackers, fishers, pickers, and hunters, as well as military personnel. The invention may be used for transporting cargo, either via carrying or pulling/pushing, over a cross-country terrain.

BACKGROUND OF THE INVENTION

One known carrying device comprises a frame with a removable arched extender and a wheel pair (Patent No. RV 2040196, "Backpack," A45F4/02, filed 25 Jul. 1995). The disadvantage of this backpack is that its wheels have a fixed line of support which cause adverse effects when transporting loads with a different center of gravity. In addition, the wheels become dirty and may stain clothing.

Another known device, which has a tubular frame consisting of props and crossbars, a holder, a pair of wheels also exists (Patent RU 2301756 "Convertible travel device" B62B1/12, A45F4/00, 27 Jun. 2017). The disadvantages of this design are as follows: unnecessary rigidity and strength of the structure, wheel design, inconvenient adjustment of the position of a center of gravity, lack of shock absorption and fixings make it inadaptable to urban terrain as well as long hikes over rougher terrain.

The present invention increases adaptability, convenience, and efficiency of use by altering the design of the frame and the wheels for greater utility, as described hereinafter.

SUMMARY OF THE INVENTION

The present invention is a collapsible carrying device for transporting luggage and/or cargo, in a manner that is easier for a user of the device than presently available. The device comprises a rectangular frame, the frame being pivotally attached to a base. Two wheels allow for rolling the device, the wheels being at least 100 millimeters in diameter. Additionally, one or more telescopic rods extend from the frame, the telescopic rods being pivotally attached to the frame, thus allowing for adjustment of an angle between the telescopic rods and the frame. The angle is based on the weight of the luggage or cargo being carried and the physical parameters of a user. Furthermore, a first pair of shock absorbers are located along the rods of the frame; they absorb shock from uneven terrain. And one or more second shock absorbers positioned in alignment with a portion of each telescopic rod to minimize shock from the inertia of the luggage or cargo being carried. The frame, wheels, and rods all collapse to form a substantially flat shape when not in use. Variations on this general concept are also disclosed hereinafter.

BRIEF DESCRIPTION OF THE DRAWINGS

FIGS. 4-6 show the loading area with a support for "parking" in the transport, work, and "parking" positions.

FIGS. 7-9 show the device in a load balance adjustment mode by means of changing the angle between the frame and handles.

FIGS. 27-28 show the same connection illustrated in FIGS. 24-26, this time illustrating the locking mechanism for keeping a desired angle between the frame and handle according to user preference.

FIG. 29 shows how the teeth within the same connection are designed, such that pressing the button (or other sensor) to unlock the angle is simple and can occur at any position.

FIG. 41).

DETAILED DESCRIPTION OF THE PREFERRED EMBODIMENT

Definitions

Figure 1:
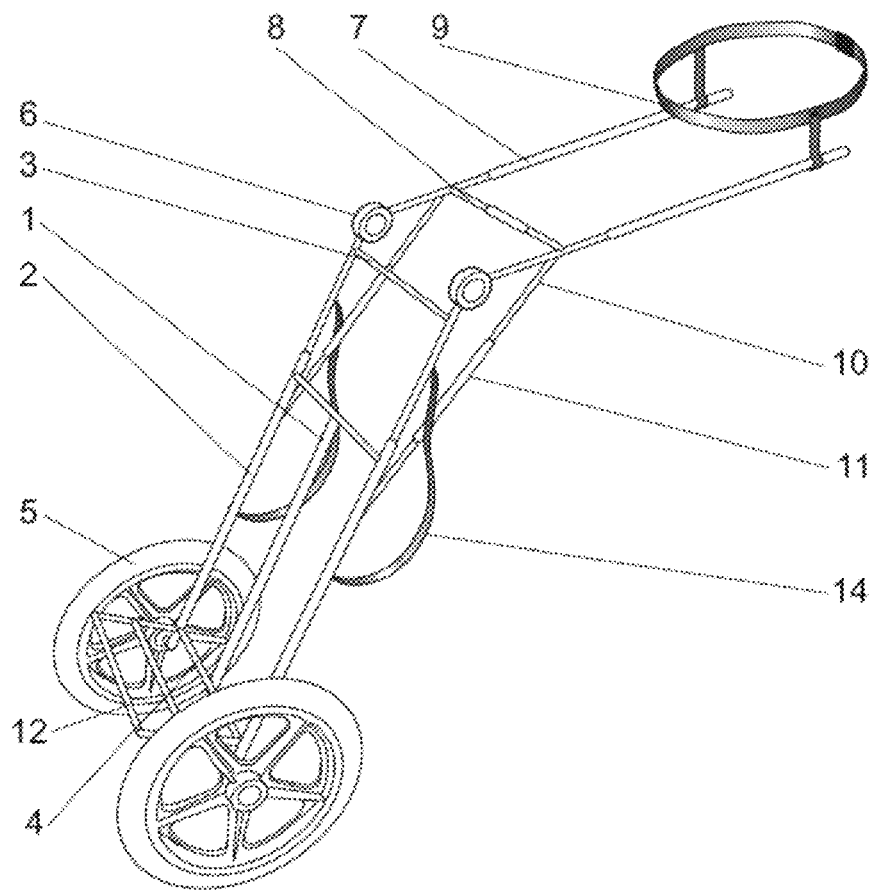
FIG. 1 shows an example of the proposed universal convertible travel device in a transport position, general view.

A base, as used herein, is defined as an additional rectangular frame, or bottom frame, (cf., back frame), acting as a bottom support for the luggage/cargo being carried; the base is hingedly attached, or hingedly coupled (i.e. pivotally attached), to the rectangular back frame.

A support bar, as used herein, is defined as at least one rod, or leg, hingedly coupled to the base, or bottom frame, acting as a stabilizer such that the device does not tip in a direction away from the user when not in motion.

"Pivotally attached," as used herein, is defined as employing any hinged coupling means allowing the elements to swing in a pivotal relationship allowing for collapsibility as well as adjustment for varying luggage or cargo. Any number and potentially all connections of the present invention may be pivotally attached to one another.

"Amortizator," as used herein, is defined as a type of shock absorber, located within the connection between the frame and the handles used for carrying. The amortizator may comprise, e.g., a spring or a pneumatic connection, depending on the particular model and use of the device. Furthermore, an amortizator may be spring-loaded with the potential for changing and fixing (i.e. locking) angles of connection (e.g., between the frame and handle) for ease and comfort of use. An amortizator is not the same as a two-way shock absorber, as is described hereinafter. An amortizator may comprise one or more shock absorbers, but amortizators also comprise other parts which make it adjustable in function.

"Back/shoulder/waist rest bar(s)," as used herein, are defined as semi-flexible supports which are coupled parallel to horizontal crossbars of the back frame. When the device is collapsed to a substantially flat shape and carried by a user, these rest bars act as comfortable yet firm supports for resting on the user's shoulder or back (or however the user chooses to carry the folded device), such that the harder portions of the folded device do no directly touch the user's body. Instead a softer contact is made with the user's body due to the back/shoulder/waist rest bar(s).

The present invention provides a novel convertible and more convenient travel carrying device, which has a frame made up of a frame, a base, one or more crossbars, a handle or handles, at least one form of shock absorbers within the frame and/or handle, and a pair of potentially detachable and re-attachable wheels. Utility of invention is provided via the installation of large diameter wheels on a frame, the use of props made in a telescopic manner, and connections between bars and handles through hinges and telescopic pull rods; a harness may be further attached to the handles.

The frame of the device is made as a rectangular frame, said frame being pivotally attached to the platform for cargo (or backpack) with a support, as well as belts/harnesses (and potentially rest bars) for transporting on a user's back In addition, the detachable wheels have an outer diameter not less than 100 mm, and they are equipped with whole-rubber or pneumatic tires. In some embodiments, the wheels have a diameter not less than 150 mm.

Furthermore, two-way shock absorbers (i.e. bilateral traction shock absorbers) are mounted on the telescopic rods, which are further connected with handles and props with the potential for motion/adjustment or disconnection, hinged joint (i.e. connections) between handles and frame/rods may be spring-actuated.

In addition, the shock absorbers are installed on the frame and/or rods, which together with the crossbars are made of telescopic tubes, and two-way (i.e., bilateral traction) shock absorbers are installed in the rods, handles, and/or frame. The shock absorbers may be comprised of any elastic or flexible material, pneumatics, as well as one or more springs.

The handles, rods, and crossbars may be telescopic, i.e. sliding into portions of one another in order to collapse and expand as desired.

A harness may also be included and comprises a belt and a strap with adjustable length, which may be used for carrying the device rather than pulling it along the ground.

Furthermore, the connection between said frame or base and said handle (used for carrying) may comprise one or more amortizators (although an connection not limited to that described here may also comprise one or more amortizators installed in a similar manner). Essentially, said amortizators comprise a spring-loaded unit which allows for the possibility of changing the angle between said handle and said frame. The connection may further be locked in place once a desired angle is achieved, thus keeping the angle at the user's desired level. Even further, the amortizator may comprise an additional shock absorber which will collapse and expand with applied pressure, thus causing a greater shock-absorbing ability when the device is in use.

The above mentioned novel features further help improve the design of a carrying device in the following manners:

The design of the upper part of the device allows for adjusting the height depending on the user's height, adjusting of the angle depending on the weight of the equipment in order to reduce pressure on the user's body at the point of attachment, adjusting the distance from the back of the legs to the projection of the point of attachment on the ground to the harness depending on the height of a user and to avoid preventing motion when walking or running (bumps on feet, heels, etc.);

The design of the device attaches to a user with three degrees of freedom, making the carried item(s) seemingly much lighter, and it does not prevent the user from changing directions or velocities. As a result of three degrees of freedom, the weight of the carried items is transferred to the frame and wheels, and a person applies only a lesser required pulling force. This allows for minimizing the gravity of the equipment at the attachment point of the device to a human body, requiring applying only pulling force and releasing the user's spine from the gravitational load of the items being carried;

The use of a harness (i.e. a belt and/or shoulder straps of adjustable length) and the design of rods with bilateral traction shock absorbers (as inertial bumps occur when walking in both directions) allows eliminating inertia pushes of the device on the body when walking, creating smooth and comfortable motion regardless of terrain. The use of a back/shoulder/waist rest bar(s) further makes transport of the folded device easier and sturdier.

The device can be easily collapsed/folded and secured on the gear in a backpack mode when a user needs to get over more difficult obstacles (rivers, ravines, steps, hills, etc.).

The present invention generally comprises a collapsible carrying device for transporting luggage and cargo. In particular, the device comprises a rectangular back frame, the back frame comprises vertical rods 2 and horizontal rods 3, 4 (the rods 2, 3, 4 may or may not be telescopic); said rectangular back frame being pivotally attached to a base 12, said base being further pivotally attached to a support bar 13, said back frame, base, and support bar forming a carrying platform onto which various items to be carried may be placed (e.g., backpack, boxes, cargo, luggage, etc.). The device further comprises two wheels 5, said wheels being disposed on opposing ends of said base, said wheels being at least 100 millimeters in diameter; one or more primary telescopic rods 7 extending from said carrying platform (these rods form a handle with which the user may grip the device for easy handling), said telescopic rods being pivotally attached 6 to said carrying platform, thus allowing for adjustment of an angle between said primary telescopic rods 7 and said rectangular back frame 2, 3, 4 of said carrying platform, said angle being based on the weight of the luggage or cargo being carried and the physical parameters of a user. Furthermore, the device comprises a first pair of shock absorbers 20, said first pair of shock absorbers 20 being positioned along a vertical portion (i.e. the vertical rods 2) of said rectangular back frame to absorb shock from uneven terrain, and one or more second shock absorbers, said second shock absorbers being positioned in alignment with a portion of each primary telescopic rod forming the handles 7 to minimize shock from an inertia of said carrying platform with said luggage or cargo, wherein said carrying platform, wheels, and rods collapse to form a substantially flat shape when not in use.

In some embodiments, the device further comprises a detachable handle coupled to said primary telescopic rod for maneuvering said device by a user's hand.

In some embodiments, said handle coupled to said primary telescopic rod connects to the open end of the rod via a ball-and-socket connection, thus allowing for a multi-directional pivoting.

In some embodiments, the device further comprises a detachable clip coupled to at least one of said telescopic rods, said clip being further attachable to a belt of a user for maneuvering said device hands free.

In some embodiments, the device further comprises a shoulder strap 14 extending from said clip, said shoulder strap being wearable over a shoulder of a user for further support.

In some embodiments, the device further comprises a harness belt 9 pivotally attached to each telescopic rod 7, said harness belt being further wearable by a user for maneuvering said device hands free.

In some embodiments, said harness belt 9 is adjustable based on a user's waist size.

In some embodiments, the device further comprises two shoulder straps 14, said shoulder straps being attached to said rectangular frame 2, 3, 4 for carrying said device as a backpack.

In some embodiments, said wheels 5 are detachable.

Figure 2:
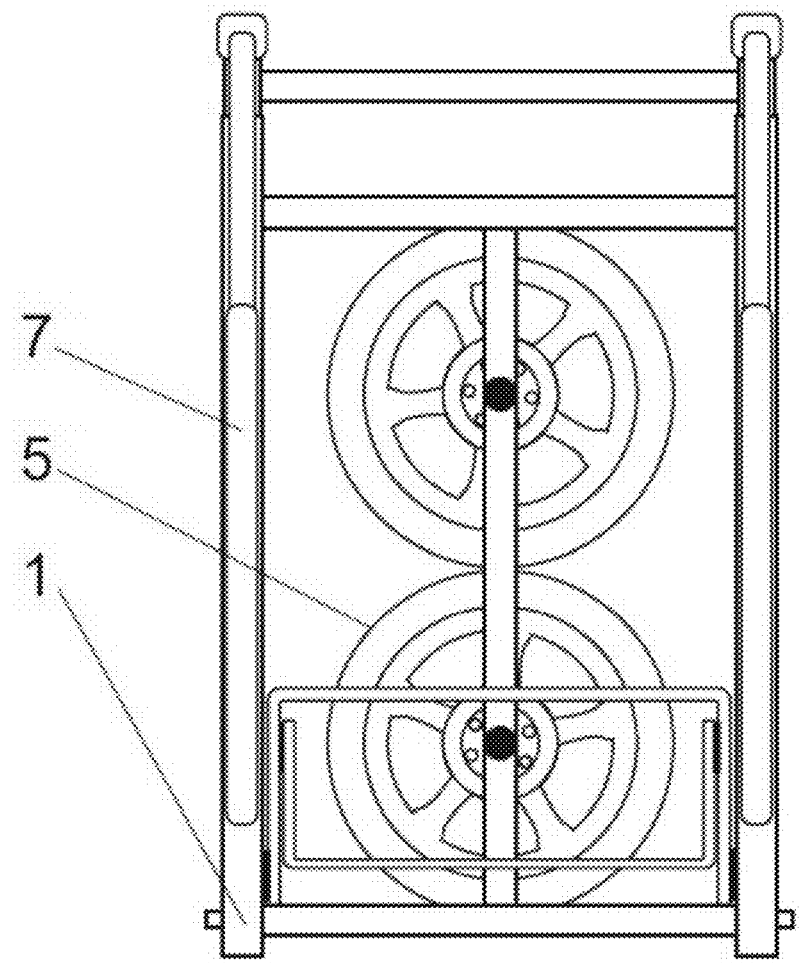
FIG. 2 shows the device when folded, in a storage position.

In some embodiments, said wheels 5 are re-attachable in a second position to a middle portion of said rectangular back frame when the device is collapsed (see FIG. 2).

In some embodiments, said wheels 5 comprise whole-rubber tires. In some embodiments, said wheels 5 comprise pneumatic tires.

Figure 9:
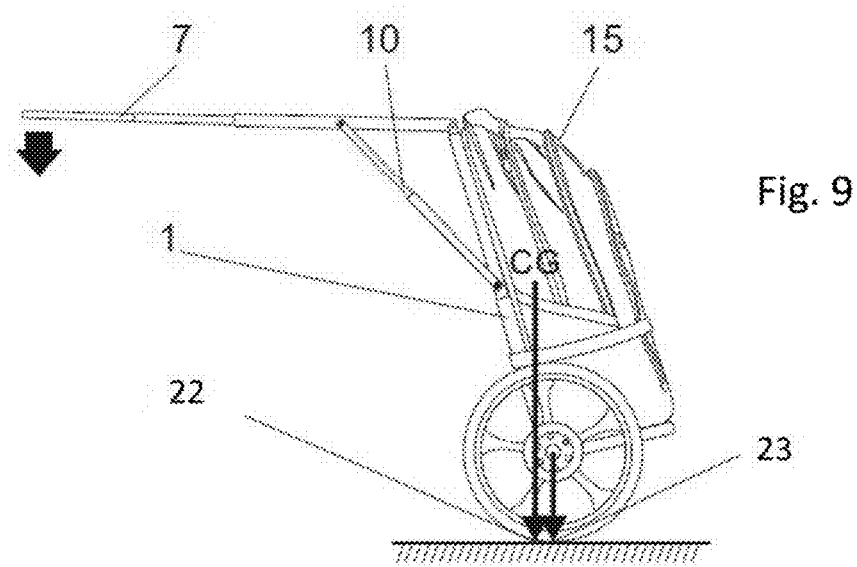

In some embodiments, said angle between said rod 7 and said rectangular back frame 2, 3, 4 is adjustable for the same user based on a size and weight of said luggage or cargo, such that a center of gravity ("CG," see FIGS. 7-9) of said carrying platform with luggage or cargo remains over said wheels 5, and such that minimal force is placed on a user maneuvering said device.

Figure 23:
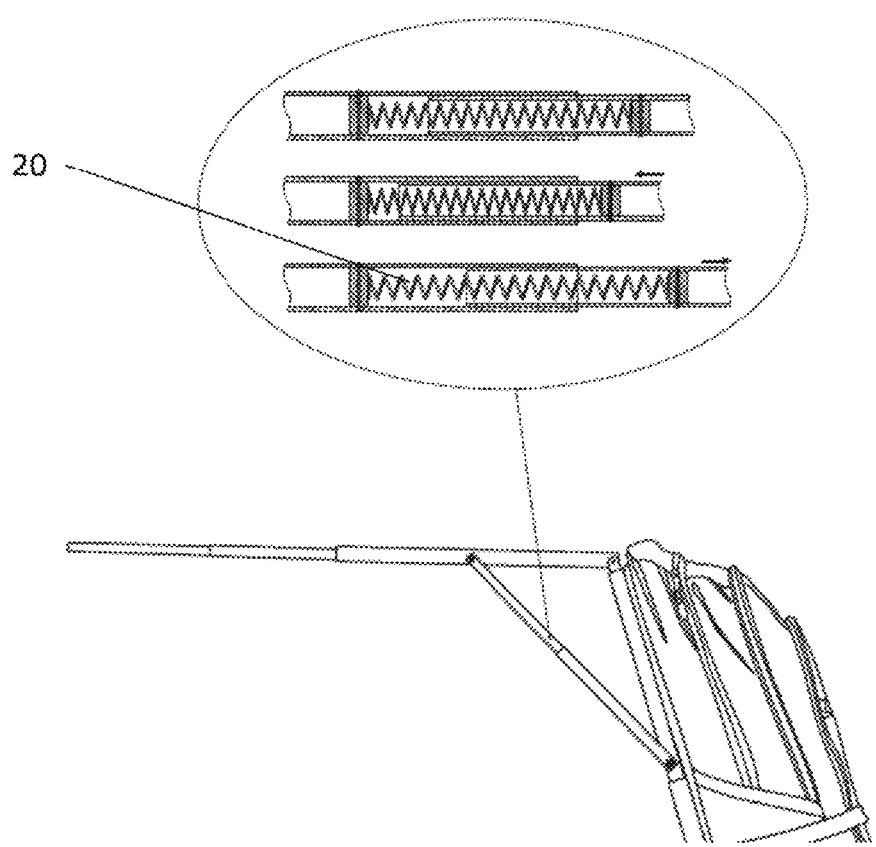
FIG. 23 shows a cross-sectional expanded view of bilateral traction (two-way) shock absorbers within the connecting rod between the handle and the frame.
Figure 24:
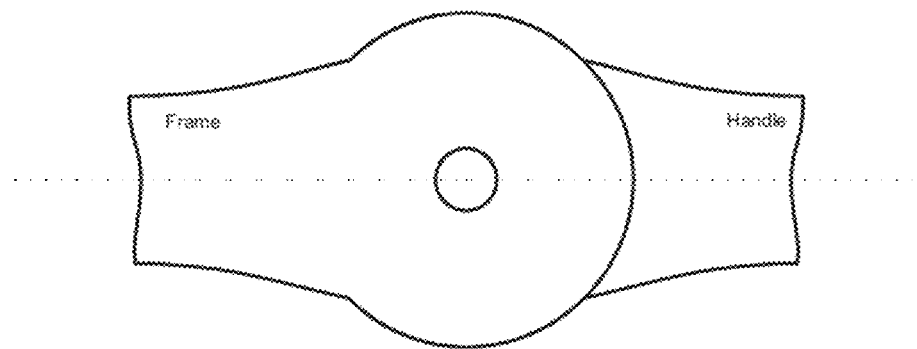
FIG. 24 shows a simple view of the connection between the handle and the frame of the device.
Figure 25:
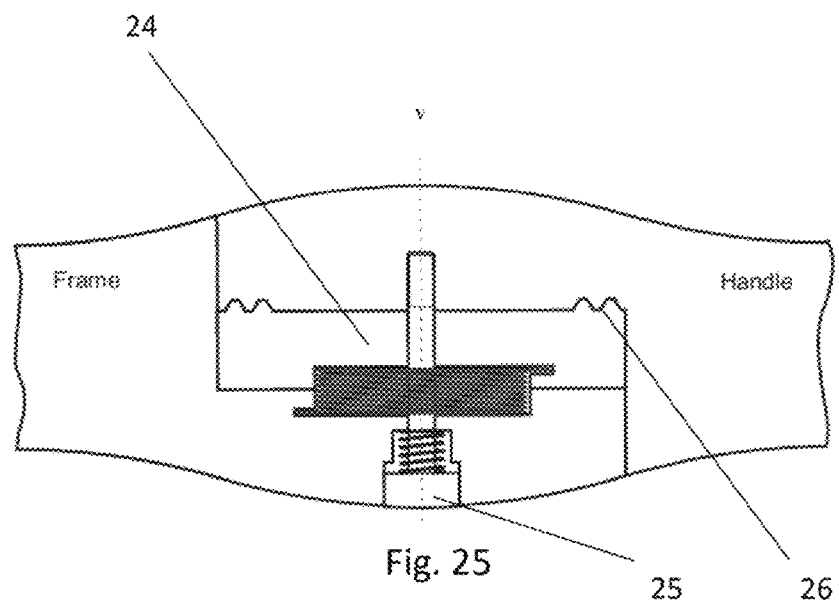
FIG. 25 shows a cross-sectional view of the connection shown in FIG. 24. The coiled element in the center allows for both additional shock absorption and a capability of locking the connection at varying degrees/angles such that the user may adjust and remains comfortable pulling or carrying his/her items using the device.
Figure 26:
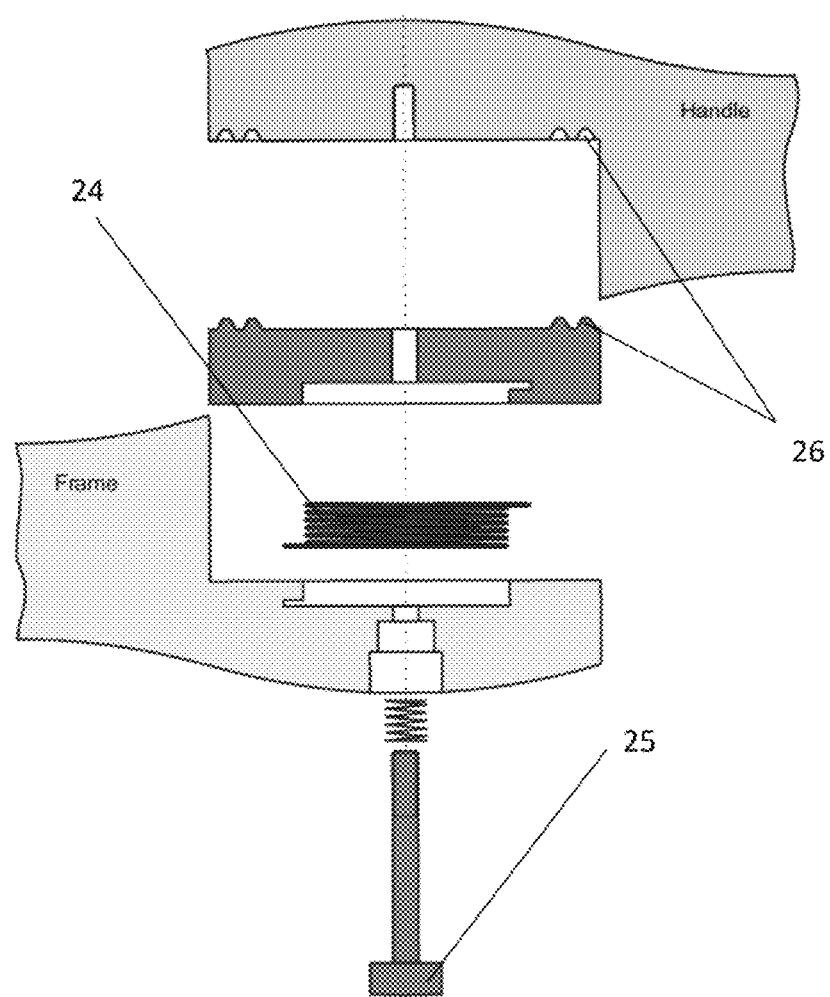
FIG. 26 shows an exploded view of the same connection shown in FIG. 25.
Figure 30:
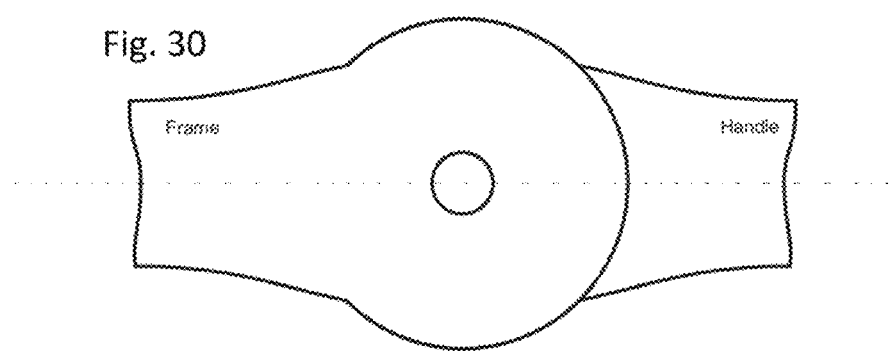
FIGS. 30-32 show the same connection at varying example angles.
Figure 31:
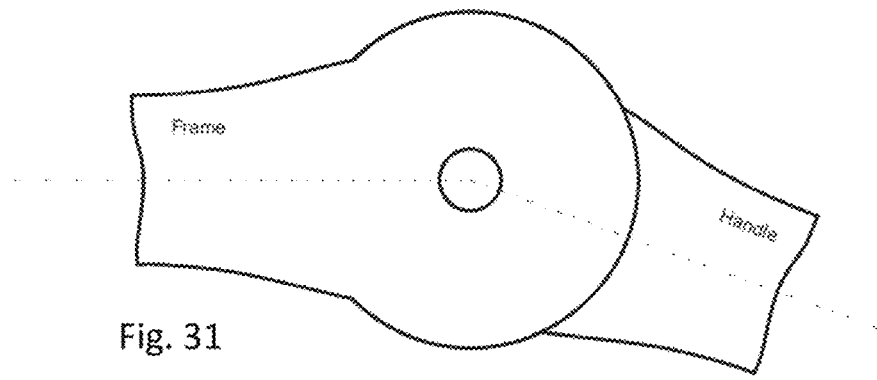
Figure 32:
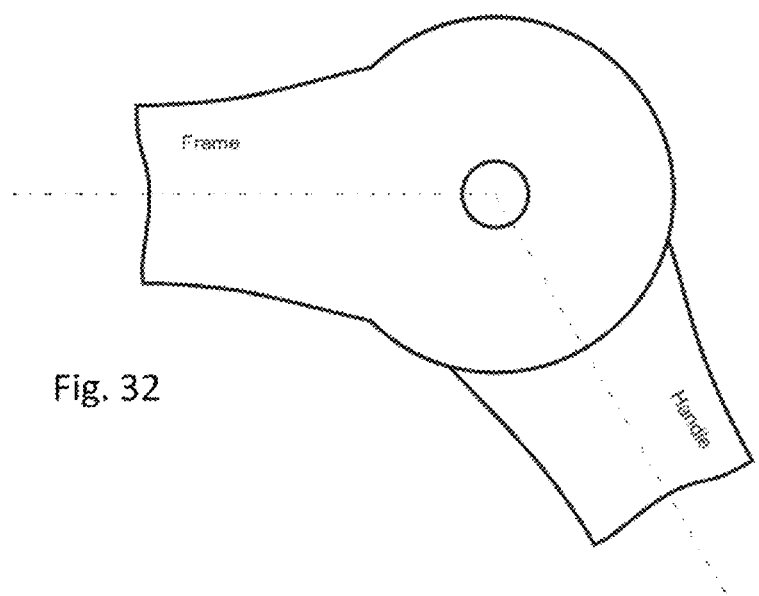
Figure 33:
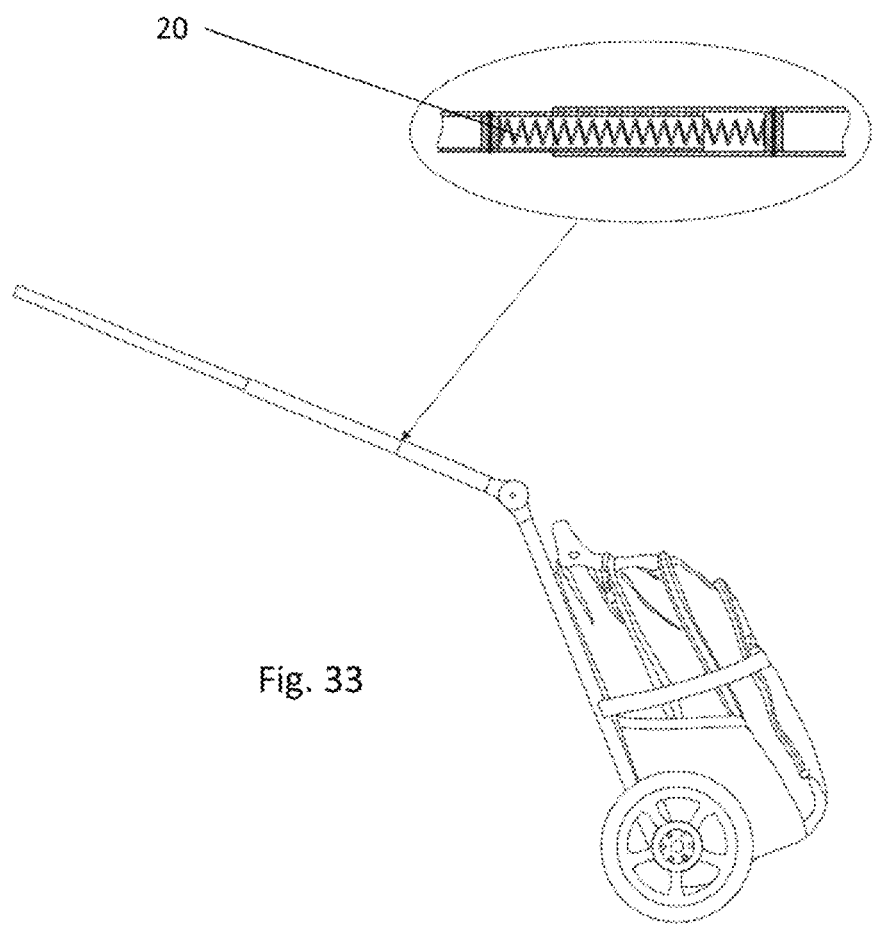
FIG. 33 shows an expanded cross-sectional view of a bilateral traction shock absorber located within the handle portion of the device, which may be installed to further absorb shock.
Figure 34:
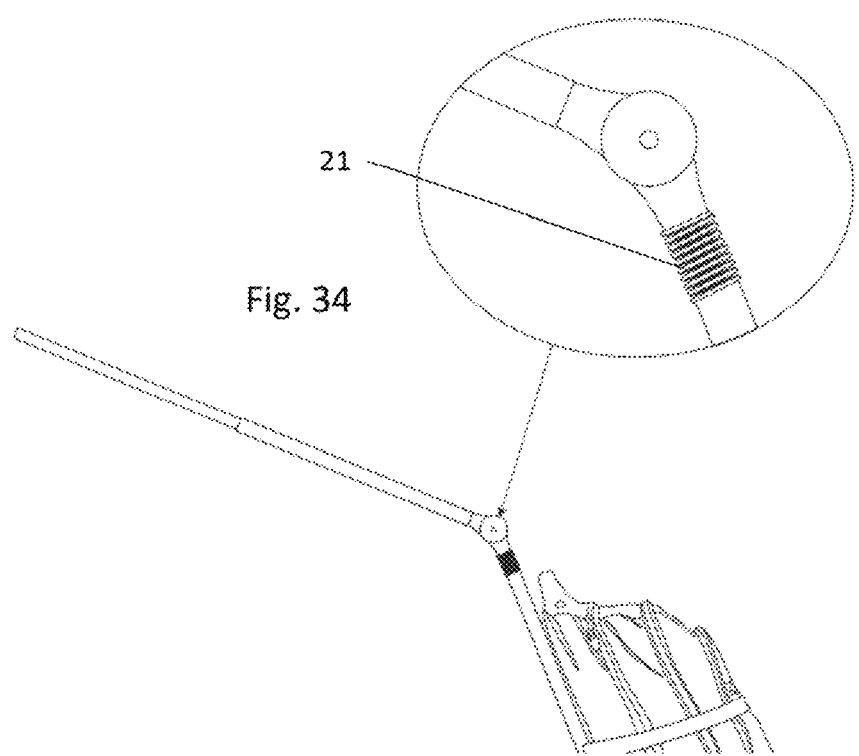
FIG. 34 shows another shock absorber, located on the frame portion of the device and, in this example, comprising a pneumatic device, rather than a spring.
Figure 35:
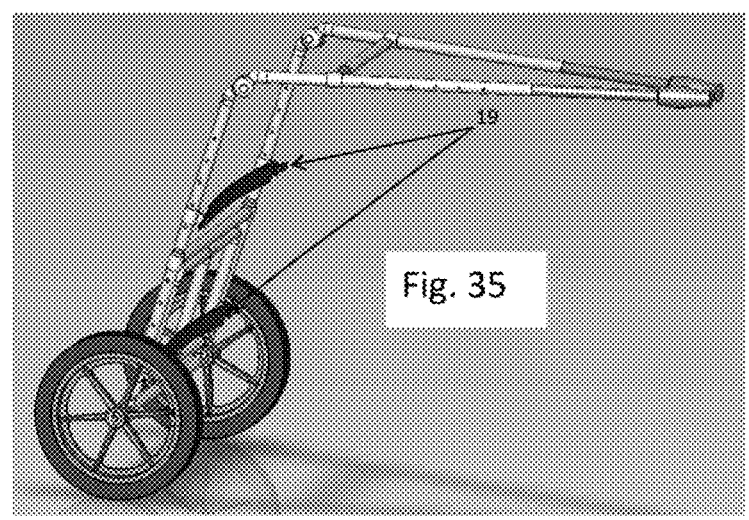
FIG. 35 shows another example embodiment of the present invention. Here, additional back/shoulder/waist rest bars 19 are also installed onto the frame. Such rest bars are sufficiently elastic to offer comfortable support yet firm enough to also support the weight of any device according to the present invention. When the device needs to be carried by a user on his/her back or shoulders, these back/shoulder/waist rest bars keeping the actual frame and the rest of device from resting directly on the user's body.
Figure 36:
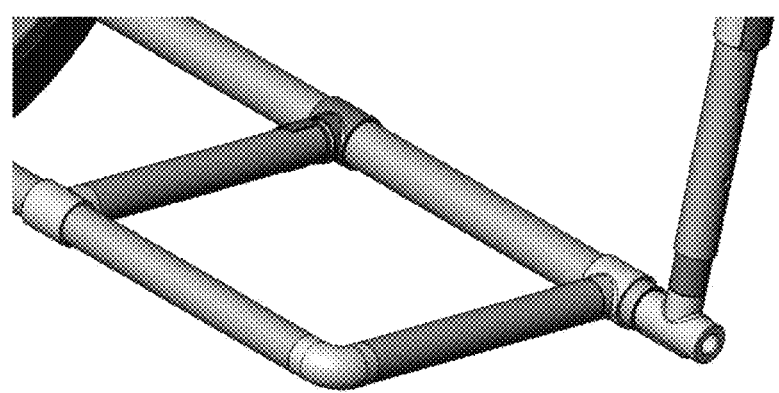
FIG. 36 shows a zoomed in view of the base.
Figure 37:
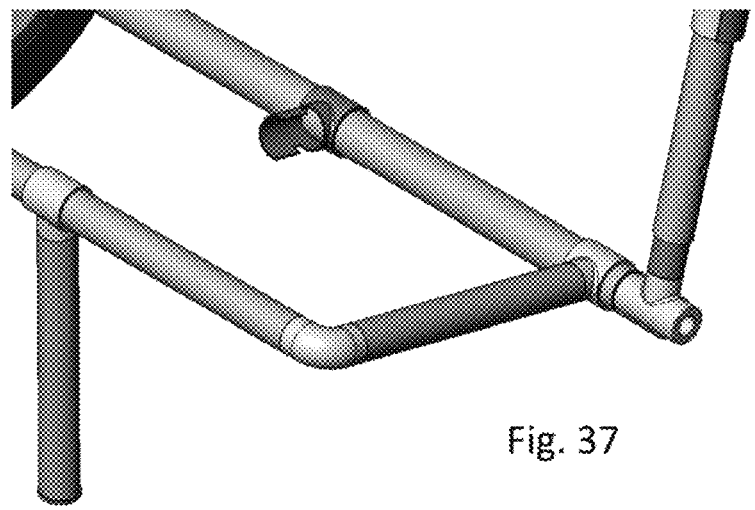
FIG. 37 shows the same embodiment as FIGS. 35-36, wherein the support bar is created by detaching the crossbar of the base (normally used for additional support).
Figure 38:
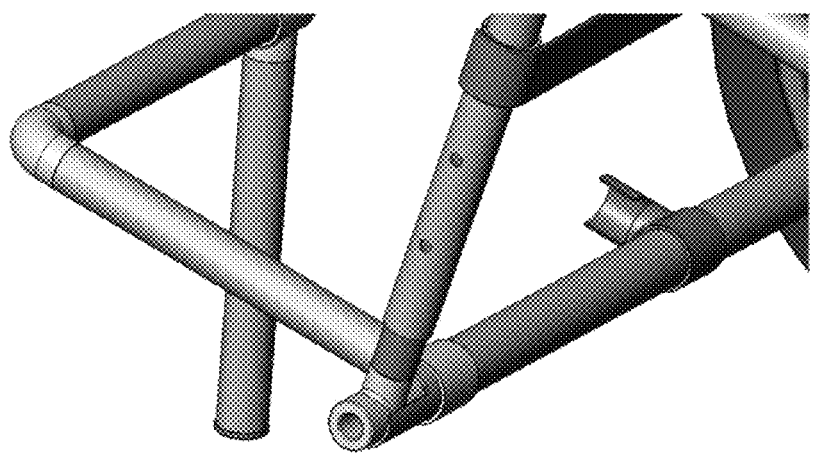
FIG. 38 shows the same function as FIG. 37, from another viewpoint angle.
Figure 39:
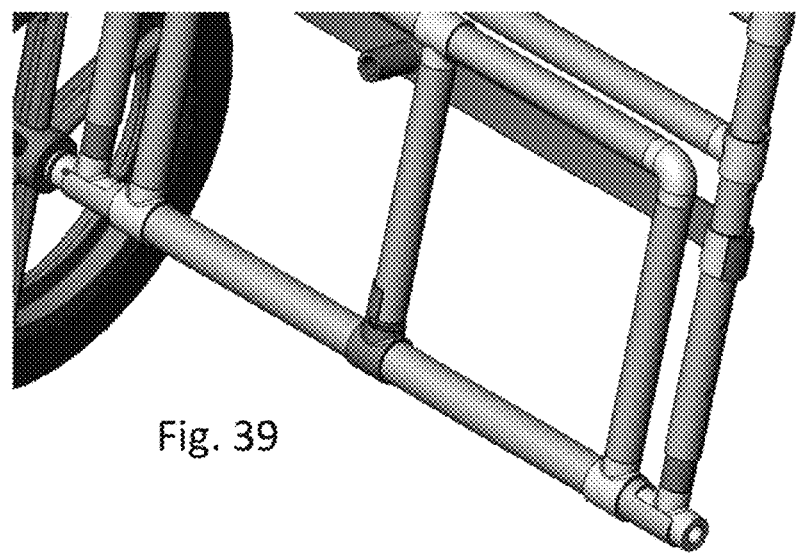
FIG. 39 shows the same embodiment as FIGS. 35-36, wherein the base is folded flatly inwards when not needed for use.
Figure 40:
FIG. 40 shows the embodiment of a bicycle transportation option with folded base.
Figure 41:
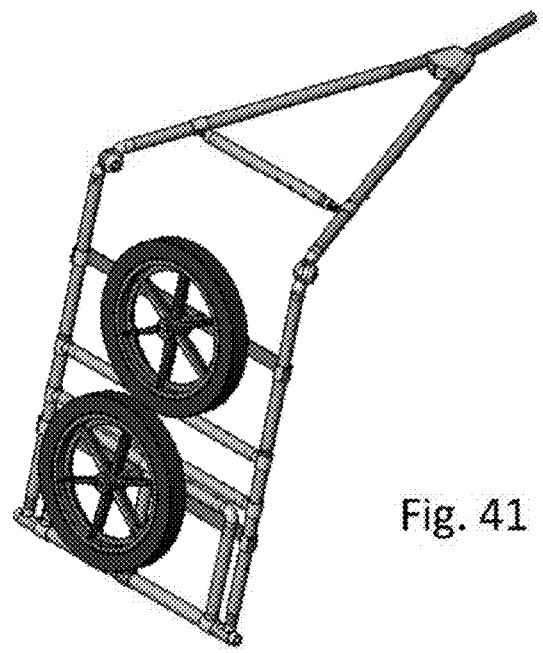
FIG. 41 shows one example of how the wheels may be attached when the invention is not in use or meant to be carried by the user.
Figure 42:
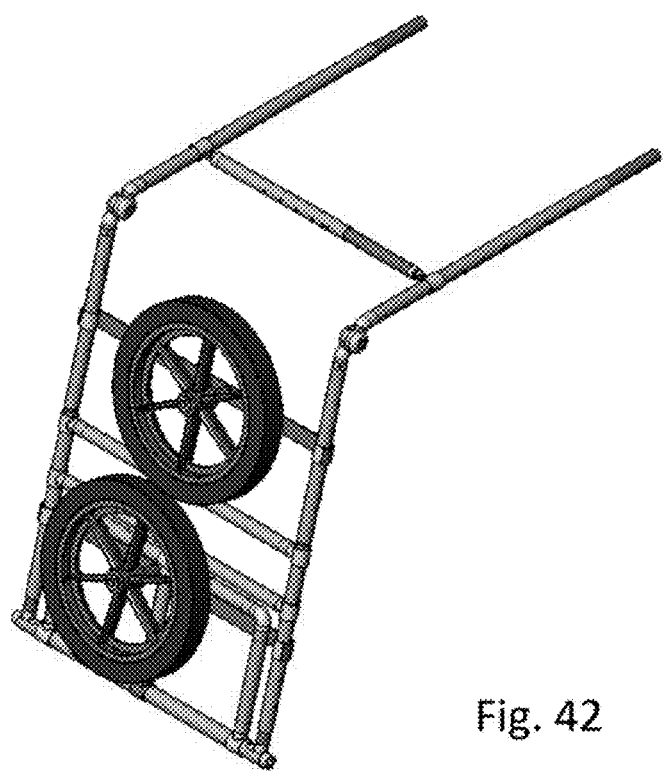
FIG. 42 shows another example of the same embodiment, wherein the crossbar connecting the rods is extended such that the handle bars are parallel rather than touching at one end (cf.
Figure 43:
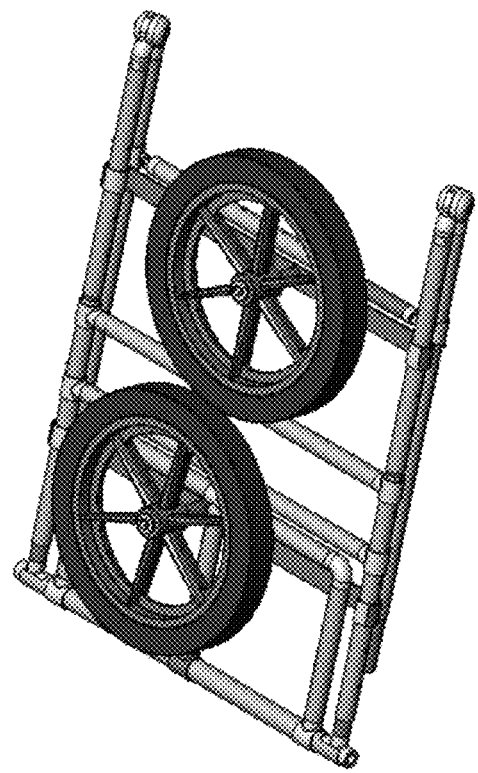
FIG. 43 shows the device in FIG. 42 further folded, such that the handle bars are folded flatly inwards.
Figure 44:
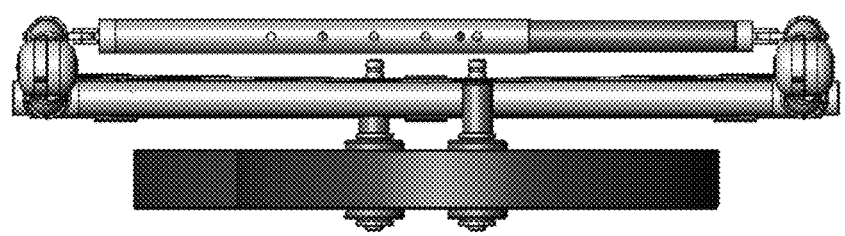
FIG. 44 shows a top view of a flatly folded device.
Figure 45:
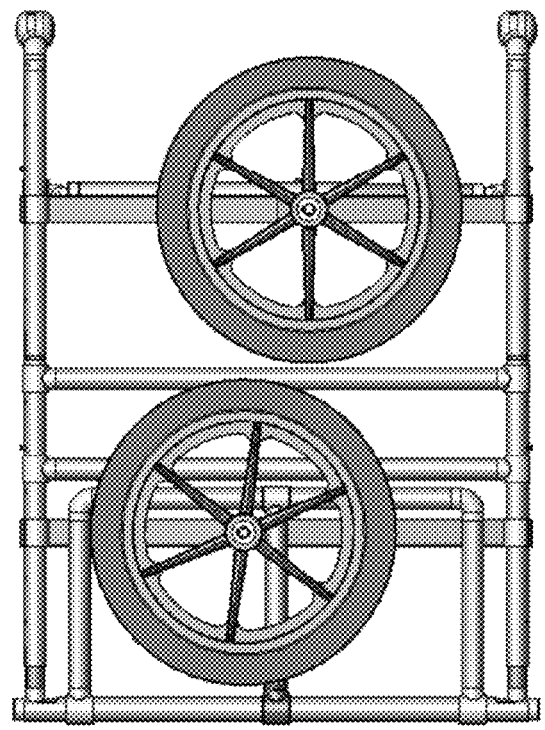
FIG. 45 shows a front view of a flatly folded device.
Figure 46:
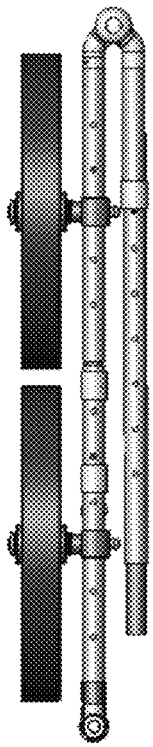
FIG. 46 shows a side view of a flatly folded device.
Figure 47:
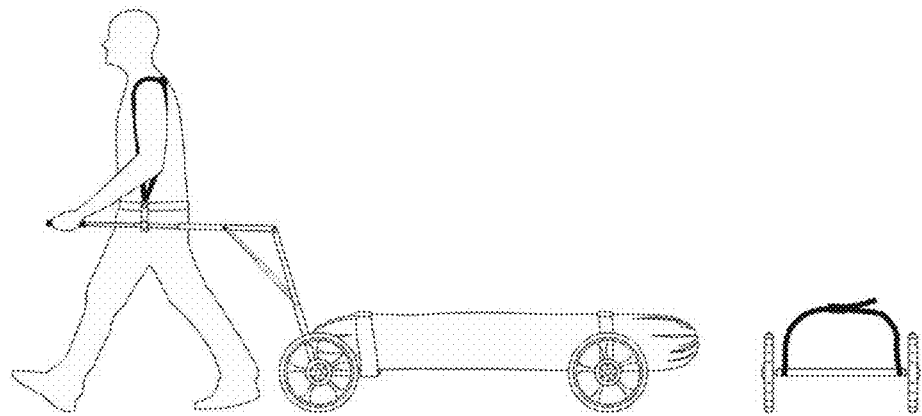
FIG. 47 shows an example of another embodiment for transporting oversized cargo, e.g., large tents, water vessels, equipment, tools/machines, etc. Depending on the weight and the size of the cargo, the weight balance may be adjusted and locked in position, in order to minimize the gravitational force of the cargo.
Figure 48:
FIG. 48 shows another embodiment of the invention comprising heavy duty amortizators connected to the frame and handles, similar to that as shown in FIG. 23.
Figure 49:
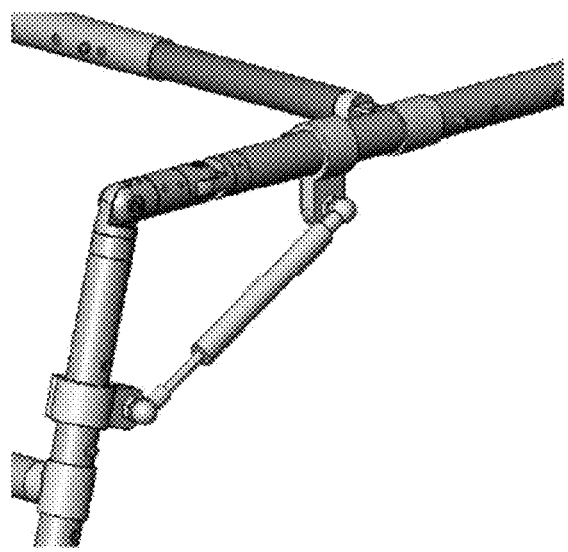
FIG. 49 shows an expanded view of the heavy duty amortizators shown in FIG. 48.
Figure 50:
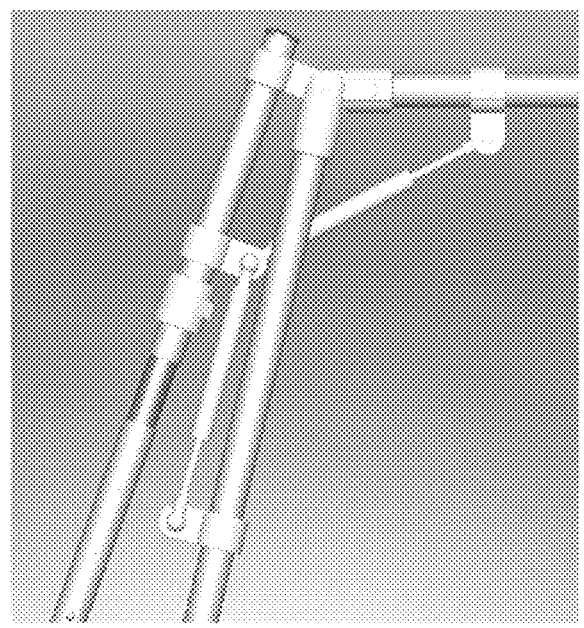
FIG. 50 shows another embodiment of heavy duty amortizators (this time, with an additional hinge in between, such that two combined smaller-sized amortizators may be used), and it also shows how a device with heavy duty amortizators may be collapsed.

In some embodiments, the device further comprises one or more intermediate telescopic rods 10, said intermediate telescopic rods 10 being positioned as angular support between said primary telescopic rods 7 and said carrying platform, wherein said intermediate telescopic rods 10 each have a third shock absorber 11 (see FIGS. 23, 33, 34 for a more detailed view of said shock absorbers) installed in a manner similar to the other shock absorbers 20, 21 located within the other rods of the device, and wherein a position of each intermediate telescopic rod 10 is adjustable via preset connections, thus stabilizing the angle between said primary telescopic rods 7 and said rectangular back frame 2, 3, 4 of said carrying platform. In some embodiments, said intermediate telescopic rods 10 are amortizators or at least comprise amortizators.

In some embodiments, each shock absorber is a two-way (bilateral) shock absorber 20.

In some embodiments, said carrying platform further comprises crossbars 1. In other embodiments, the device comprises even more crossbars 8 located, for example, as a horizontal connection between the primary telescopic rods. Any crossbar may further contain a shock absorber of any kind to further make use of the device more efficient and smooth for a user. Furthermore, back/shoulder/waist rest bars 19 may also be installed on the device, such that when the device is being carried in a relatively flat shape, the harder portions of the device do not rest on the user's back or shoulders (or other body part). These rest bars 19 may be comprised of varying elastic yet firm material, such that the rest bars may bend slightly in order to be more comfortable, yet strong enough to withhold the weight of the entire device and carried items.

In some embodiments, said rectangular back frame 2, 3, 4 is expandable.

In some embodiments, said base 12 is expandable.

In some embodiments, said wheels 5 further comprise bearings, i.e., a bearing run for a smooth passage of the surface irregularities.

In some embodiments, said primary telescopic rods 7 are pivotally attached to a vehicle (e.g., a car, a bike, a scooter, etc.).

The adjustment of the angle of any hinged connection is facilitated using additional amortizators, which may be located at each such hinged connection (see FIGS. 24-32), e.g., in place of the intermediate rod(s) 10. The amortizators serve at least two functions—the first being a spring-actuated swinging ability to allow for angle adjustment to be easy and require very little force, the second function being a locking mechanism in order to fix the desired angle of the hinged connection. Any hinged connection may further comprise an amortizator within the hinged connection between the primary rod (i.e. handle) and the back frame (i.e. frame) of the device. The handle or frame portions comprise teeth 26 such that the angle can be locked and unlocked (as shown in FIGS. 27 and 28). The amortizator comprises a center coil (made from, e.g., spring material) 24, a bolt (also serving as the lock/unlock button) 25, and an inner part comprising the same teeth 26 but now complementing the teeth located on either the handle or frame portion of the hinged connection. A user may press the button 25, which unlocks the hinge and makes it adjustable to change the angle, and the user releases the button 25 in order to re-lock the hinged connection at the desires angle (via the teeth prohibiting the hinge from moving). The coil 24 allows for spring-actuated swinging ability for ease of use and adjustment. It should be noted that depending on the load 15, various combinations of particular angles of hinged connections coupled with varying lengths of the telescopic rods allow for any user to set the desired parameters based on particular preference as well as comfort and lightening of the gravitational load of the carried items.

Figure 10:
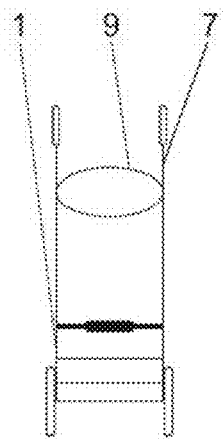
FIGS. 10-12 show the device in varying modes of adjusting the distance between the handles.
Figure 11:
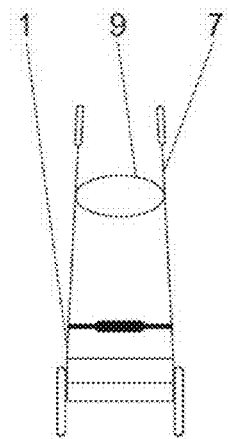
Figure 12:
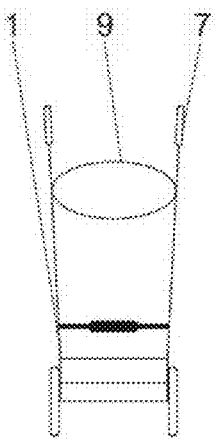
Figure 13:
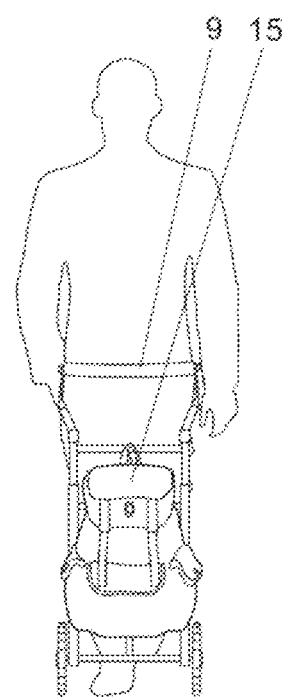
FIGS. 13-15 show the device with a backpack in a transport position, with attachment options to a user's belt.
Figure 14:
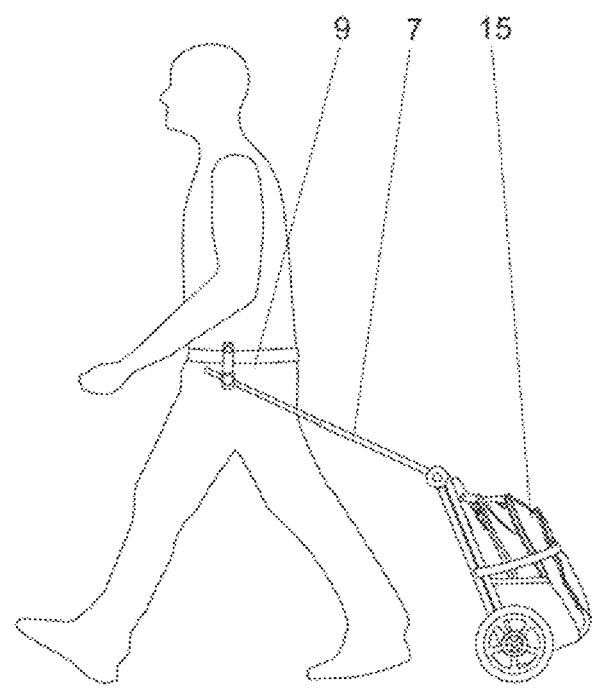

The device is used as follows:

The device is assembled by means of attaching the primary rods 7 to the carrying platform, quick-lock wheels 5 to the corresponding units at the bottom of the back frame. Then, a final adjustment of the device is carried out: length of any and all the rods may be adjusted, so long as they are telescopic and not static (it should be noted that the crossbars or any horizontal rod, if telescopic, may also be adjusted according to user preference, which will increase or decrease the width of the device (i.e., the width between the handles/points of attachment of the horizontal crossbar (see, e.g., FIGS. 10-12)). The angle of any and all hinged connections (see FIGS. 7-9 and 30-32) may also be adjusted according to user preference.

The device is placed (rested) on the ground, resting on the wheels 5 on one side and on the ends of the primary rods 7 (forming handles) on the other side. The support bar 13 reclines, the load (e.g., a backpack) 15 is placed on the base 12 and the support bar 13 is then un-reclined and secured, for example, by means of straps with adjustable length.

At first, the distance between the primary rods 7 may be adjusted by means of changing the length of a transversal adjustable telescopic crossbar 8. It should be slightly longer than the width of the user's hips so that the rods 7 do not squeeze the user's hips when moving (see FIGS. 10-12). Final adjustment is carried out depending on the dimensions and weight of the load as well as physical parameters of a person: height of user and width of the hips.

The position of the base 12 (distance between the axis of each wheel 5) may also be adjusted. If the width of the load is greater than the wheel tread, the base 12 is shifted upward so that the load does not touch the wheels and thus does not prohibit rotation of said wheels 5.

Then, the harness is placed on the belt 9, a user picks up the device by the primary rods 7 or further attached handles, and the user attaches the harness 9 to the handles or rods 7 while in a position facing the device, i.e. opposite to motion. It is easier to adjust for balance in this position.

Subsequently, the adjustment of the load 15 balance is carried out, the purpose of which is to find the position where the projection of the center of gravity (CG) of the load to the ground 22 is located slightly in front of the projection of the axis of the wheels 5 to the ground 23. In this position, the rods 7 will push slightly down on the harness 9, preventing backward tipping of the device (see FIGS. 7-9). After achieving this result, a user unzips the belt, turns around in the opposite direction, and fastens the belt for use.

Adjustment is carried out by changing the geometry of the device, i.e. the angle between the rods and frame, as well as the length of telescopic rods. This can be accomplished in the following exemplary ways:

a) by changing the length of a telescopic rod of the device with a fixed position of the attachment points of the shock absorber rods to the rods and handles;

b) by changing the length of the primary rods at a fixed length of the secondary rods, and vice versa;

c) by changing the place of the attachment points of the primary rods to the secondary rods, and vice versa.

The handle length may be set so that when the device is in motion it does not hit the heels or the back of the user's footwear. When running, the length of the handles may increase for ease of use and comfort.

The user may perform various adjustments of the straps of the harness 9 that are necessary to eliminate the rigidity of the device fastening to the body, i.e. their length is carried out in motion, depending on the weight of the load and physical parameters of the person: the heavier the load and the stronger the inertial thrusts, the greater margin oscillation amplitude is needed for the handles and, therefore, a longer strap is needed.

Figure 19:
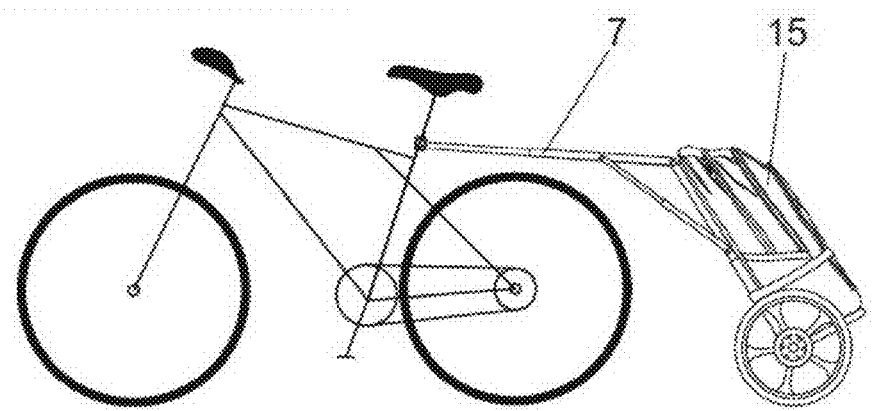
FIGS. 19 and 20 show the device with a bicycle transportation option.
Figure 20:
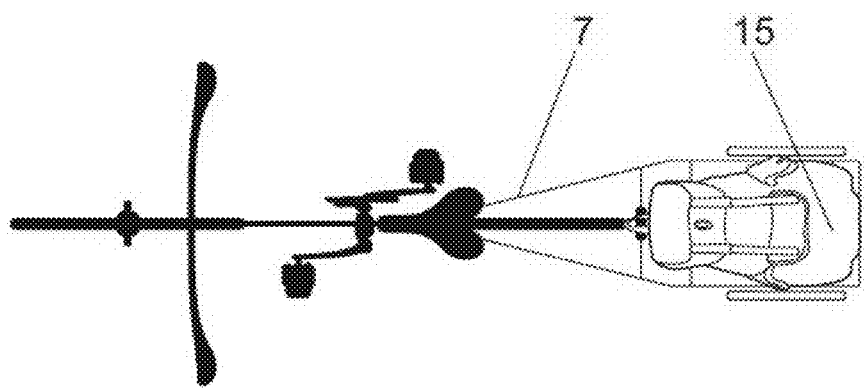

The device may be attached to a bicycle, for example, to the seat post (see FIGS. 19-20). For this purpose, the primary rods 7 are brought together forming a rigid triangle with the frame (there may be other uses other than vehicles wherein the rigid triangle form is used). The ends of the rods 7 are connected together using a clamp or another known connection; they are attached to a bicycle by means of a special mount.

The device with a load 15 can be transported on the user's back like a backpack using the shoulder straps 14 attached to the back frame. This is required, for example, to get over more difficult obstacles (rivers, ravines, steps, etc.) or when moving on rough terrain. If this transition is short, the handles, pull rods, and wheels can be left in their places without collapsing the device entirely. Other quick necessary carries may also be performed using the back/shoulder/waist rest bars 19, if installed on the device in use.

Figure 17:
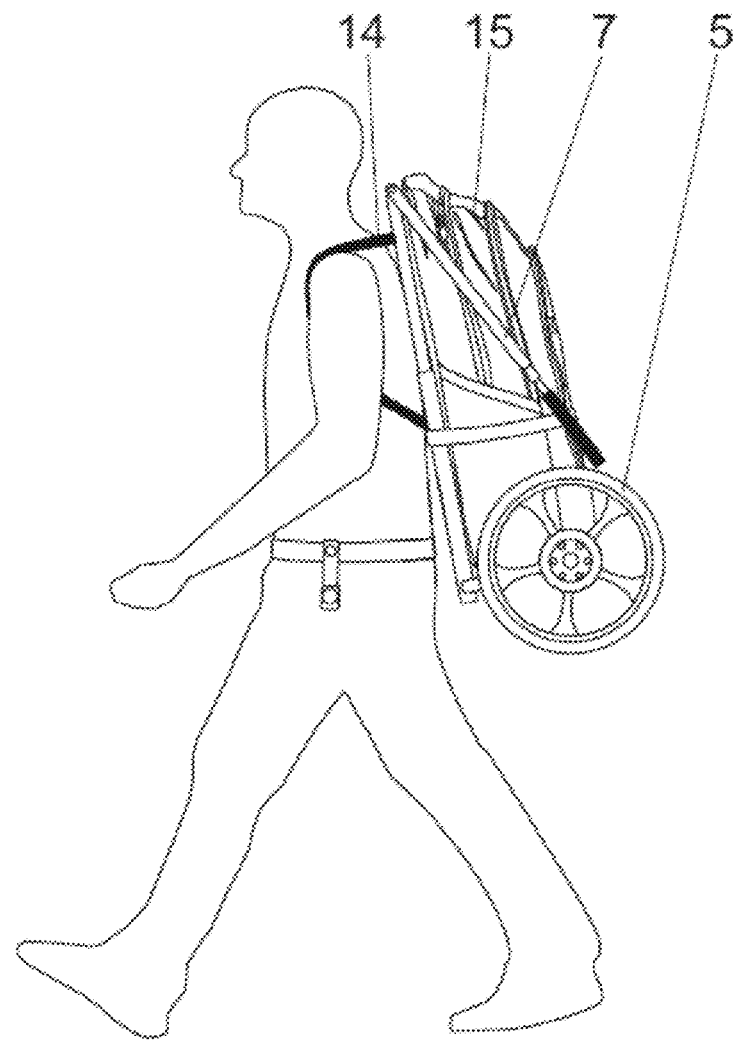
Figure 18:
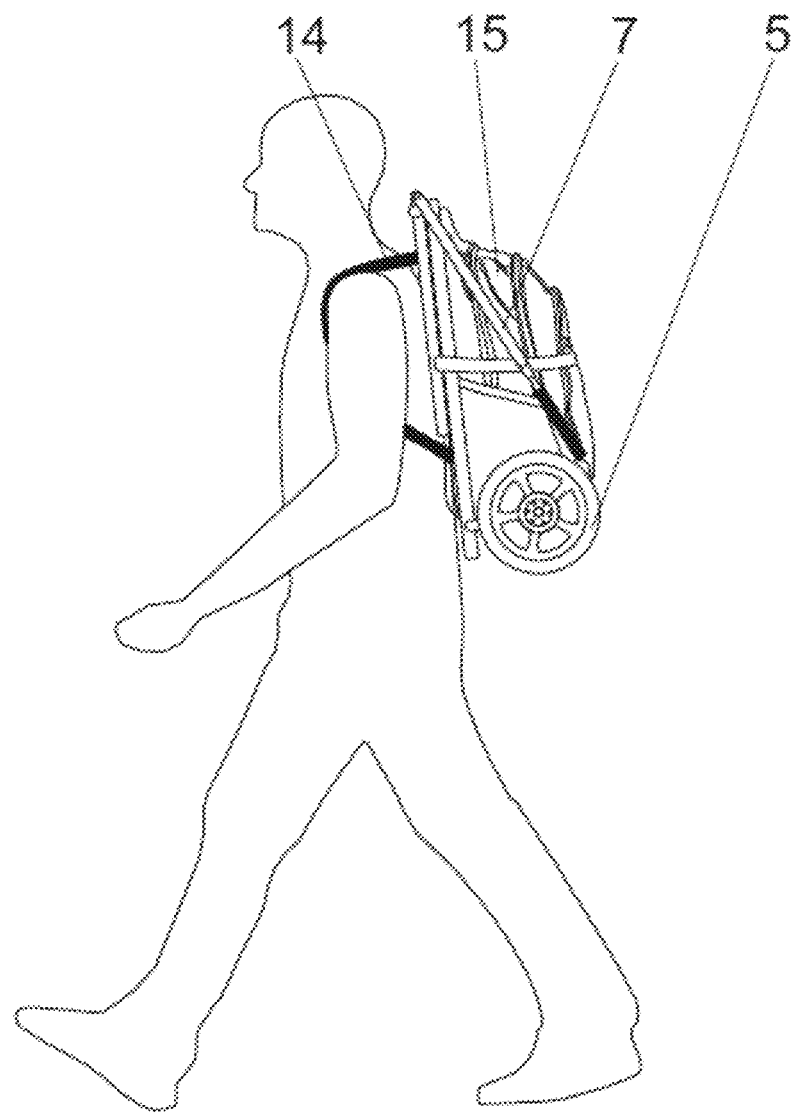

In case of a longer motion in the "backpack" mode, the handles and pull rods can be removed or pulled hack, so that they do not interfere. The wheels may also be displaced to the end of support (see FIG. 17), which provides space for their mounting.

Figure 15:
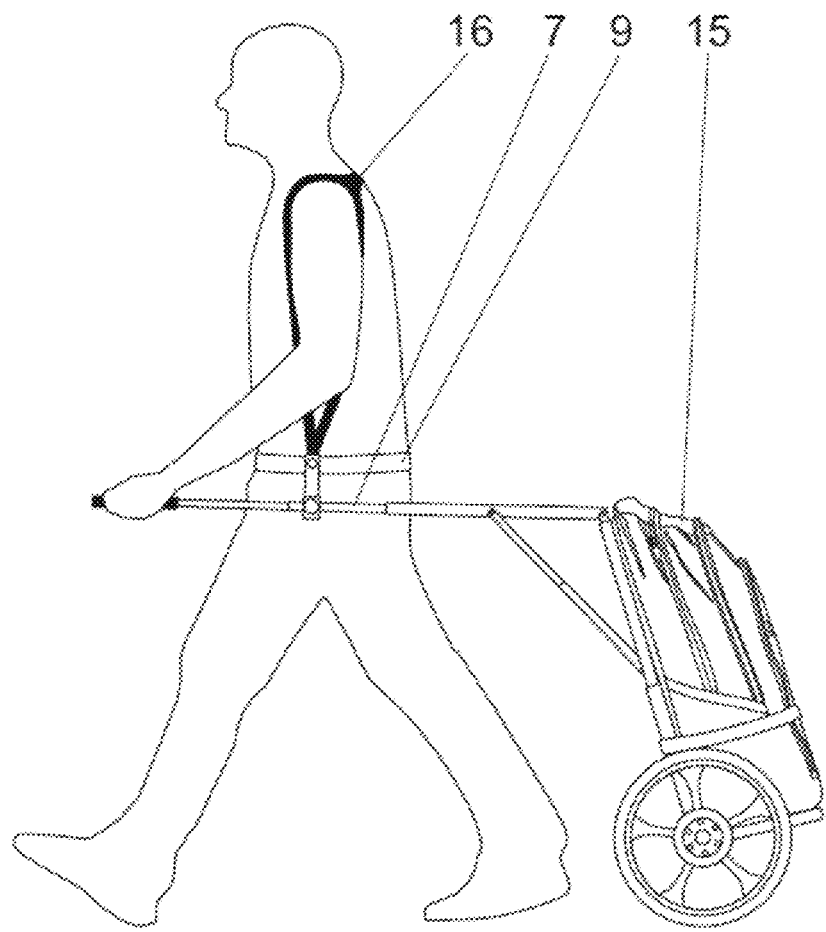
Figure 16:
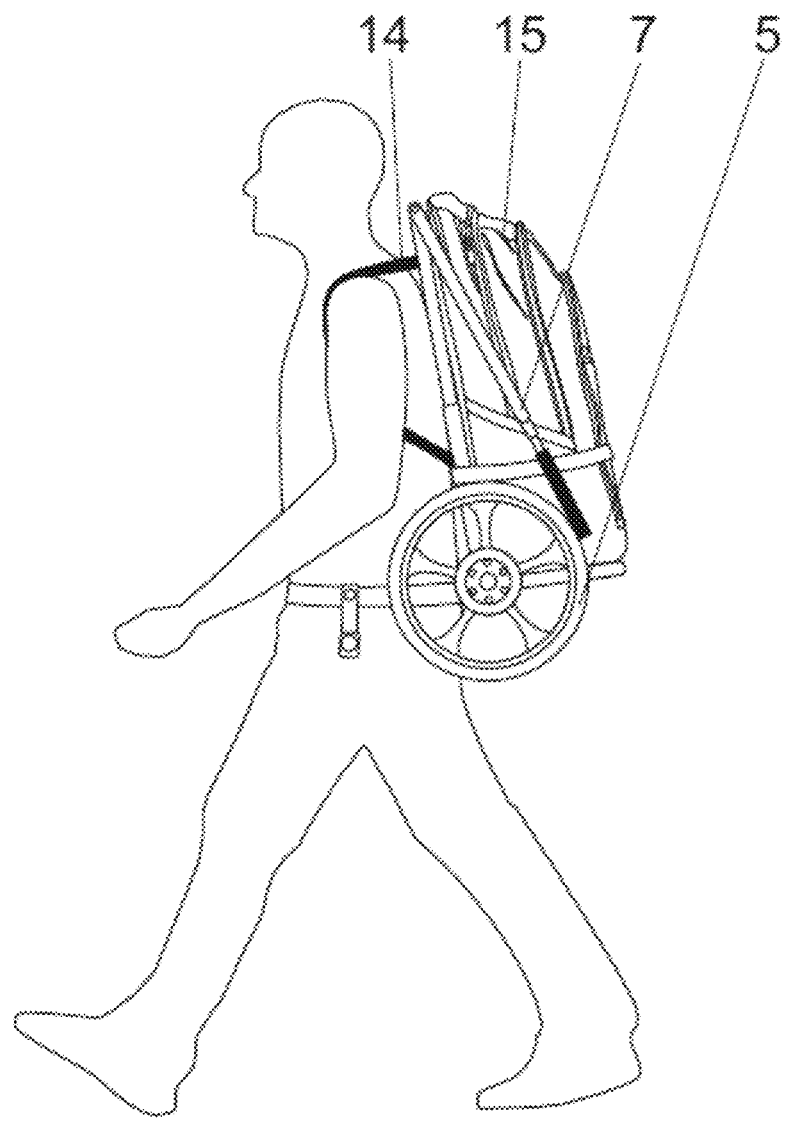
FIGS. 16-18 show the device with a backpack, with mounting options on the user's back.

A user may use the shoulder straps-braces 16 attached to the belt of the harness 9 in the attachment point of the suspenders (see FIG. 15). These straps provide maximum comfort on long hikes. For example, the tightening belt (i.e. harness) 9 can cause discomfort. If loosened, it can slide down under the pressure of handles/rods, because balance is adjusted so that there is a slight downward pressure on the handle for the device not to tip over backwards.

Figure 3:
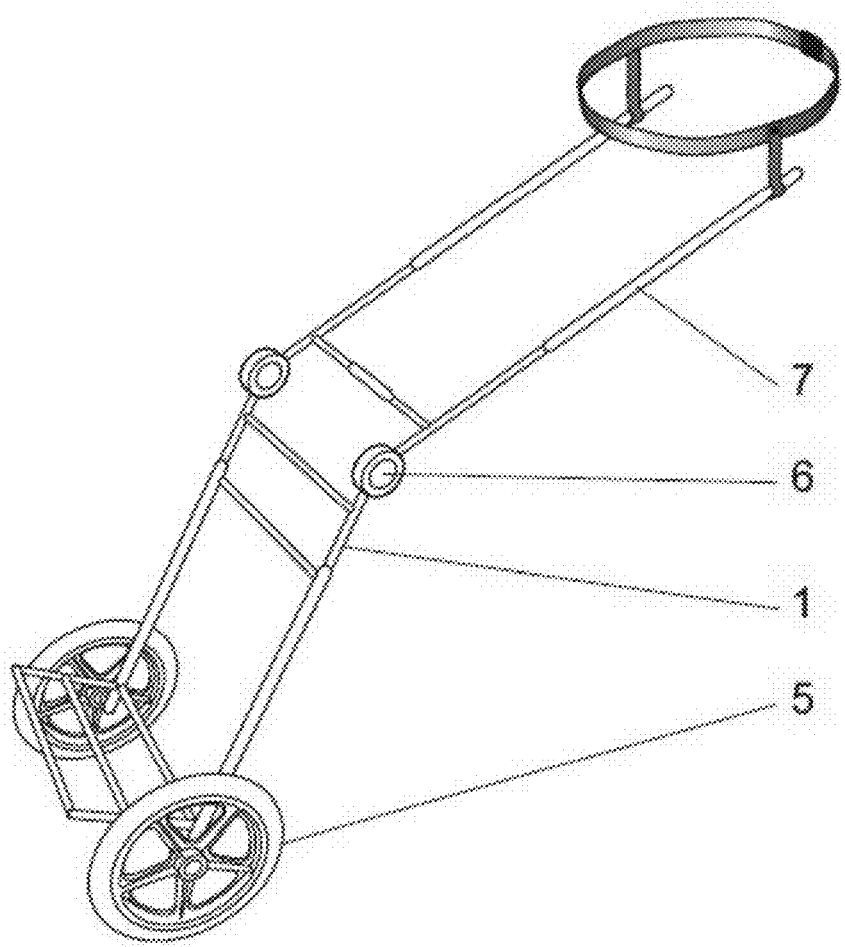
FIG. 3 shows the device in a lightweight option configuration.

A device for light loads may be used in a lightweight version (see FIG. 3) with removed intermediate rods 10, two-way shock absorbers 11 that may be too stiff using less rigid, optionally spring-loaded hinges 6. The angle between the frame and the primary rods may be adjusted by loosening the central nut followed by tightening it.

Figure 21:
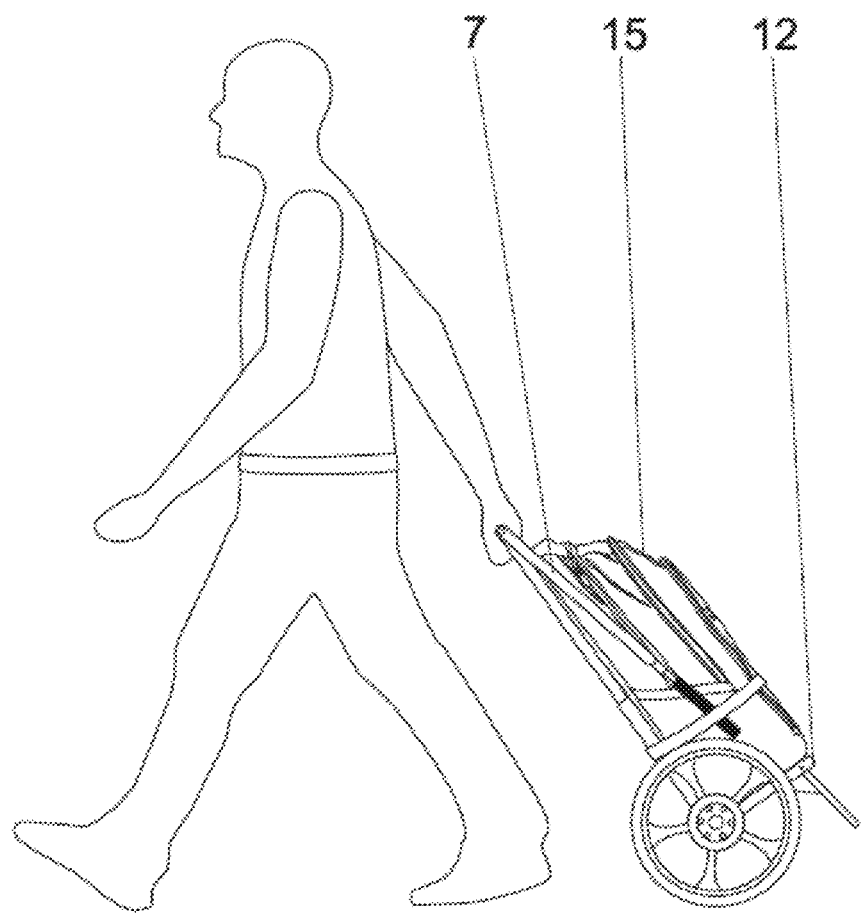
FIG. 21 shows the device with a transportation option for short distances.
Figure 22:
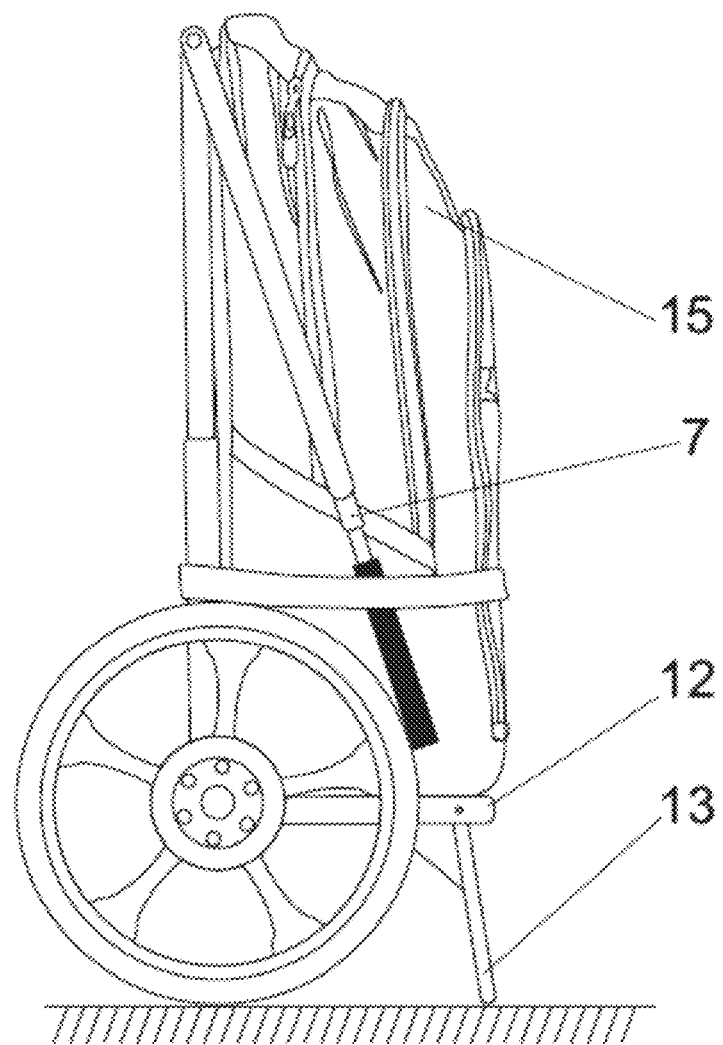
FIG. 22 shows the device with a backpack in the "parking" position.

The device can simply be pulled by handles/primary rods, similar to a suitcase on wheels. The upper transverse tube (crossbar) of the frame may also be used as a handle (see FIG. 21). Such a method may be used in short-term circumstances or when moving in confined or high traffic areas, such as airports or other mass transit hubs.

The device can be easily disassembled and placed, for example, in a case, taking a further compact form for transporting of the device (see FIG. 2).

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A collapsible carrying device for transporting luggage and cargo, comprising:
   a rectangular back frame, said rectangular back frame being pivotally attached to a base, said base being further pivotally attached to a support bar, said back frame, base, and support bar forming a carrying platform,
   two wheels, said wheels being disposed on opposing ends of said base, said wheels being at least 100 millimeters in diameter,
   one or more primary telescopic rods extending from said carrying platform, said primary telescopic rods being pivotally attached to said carrying platform, thus allowing for adjustment of an angle between said primary telescopic rods and said rectangular back frame of said carrying platform, said angle being based on the weight of the luggage or cargo being carried and one or more physical parameters of a user,
   a first pair of shock absorbers, said first pair of shock absorbers being positioned along a vertical portion of said rectangular back frame to absorb shock from uneven terrain, and one or more second shock absorbers, said second shock absorbers being positioned in alignment with a portion of each primary telescopic rod to minimize shock from an inertia of said carrying platform with said luggage or cargo,
   wherein said carrying platform, wheels, and rods collapse to form a substantially flat shape when not in use.

2. The device of claim 1, further comprising a detachable handle coupled to said primary telescopic rod for maneuvering said device via a user's hand.

3. The device of claim 2, wherein said handle coupled to said primary telescopic rod comprises a ball-and-socket connection, thus allowing for a multi directional pivoting.

4. The device of claim 1, further comprising a detachable clip coupled to at least one of said telescopic rods, said clip being further attachable to a belt of a user for maneuvering said device hands free.

5. The device of claim 4, further comprising a shoulder strap extending from said clip, said shoulder strap being wearable over a shoulder of a user for further support.

6. The device of claim 1, further comprising a harness belt pivotally attached to each telescopic rod, said harness belt being further wearable by a user for maneuvering said device hands flee.

7. The device of claim 6, wherein said harness belt is adjustable based on a user's waist size.

8. The device of claim 1, further comprising two shoulder straps, said shoulder straps being attached to said rectangular frame for carrying said device as a backpack.

9. The device of claim 1, wherein said wheels are detachable.

10. The device of claim 9, wherein said wheels are re-attachable in a second position to a portion of said rectangular back frame when the device is collapsed.

11. The device of claim 1, wherein said wheels comprise whole-rubber tires.

12. The device of claim 1, wherein said wheels comprise pneumatic tires.

13. The device of claim 1, wherein said angle between said rod and said rectangular back frame is adjustable for the same user based on a size and weight of said luggage or cargo, such that a center of gravity of said carrying platform with luggage or cargo remains over said wheels, and such that minimal force is placed on a user maneuvering said device.

14. The device of claim 1, further comprising one or more intermediate telescopic rods, said intermediate telescopic rods being positioned as angular support between said primary telescopic rods and said carrying platform, wherein said intermediate telescopic rods each have a third shock absorber, and wherein a position of each intermediate telescopic rod is adjustable via preset connections, thus stabilizing the angle between said primary telescopic rods and said rectangular back frame of said carrying platform.

15. The device of claim 1, wherein each shock absorber is a two-way (bilateral traction) shock absorber.

16. The device of claim 1, wherein said carrying platform further comprises crossbars.

17. The device of claim 1, wherein said rectangular back frame is expandable.

18. The device of claim 1, wherein said base is expandable.

19. The device of claim 1, wherein one or more pivotally attached connections further comprise one or more amortizators.

20. The device of claim 1, wherein said primary telescopic rods are pivotally attached to a vehicle.

* * * * *